(12) United States Patent
Finke (10) Patent No.: US 10,055,619 B2
(45) Date of Patent: Aug. 21, 2018

(54) SYSTEMS AND METHODS FOR COMPENSATION OF INTERFERENCE IN RADIOFREQUENCY IDENTIFICATION (RFID) DEVICES

(71) Applicant: INTERMEC, INC., Lynnwood, WA (US)

(72) Inventor: Thomas Finke, Balingen (DE)

(73) Assignee: INTERMEC, INC., Lynnwood, WA (US)

( * ) Notice: Subject to any disclaimer, the term of this patent is extended or adjusted under 35 U.S.C. 154(b) by 0 days.

(21) Appl. No.: 15/185,697

(22) Filed: Jun. 17, 2016

(65) Prior Publication Data

US 2017/0364718 A1    Dec. 21, 2017

(51) Int. Cl.
*G08B 13/14*     (2006.01)
*G06K 7/10*      (2006.01)
*H01Q 1/22*      (2006.01)
*H01Q 7/00*      (2006.01)

(52) U.S. Cl.
CPC ....... *G06K 7/10336* (2013.01); *H01Q 1/2208* (2013.01); *H01Q 7/00* (2013.01)

(58) Field of Classification Search
CPC ............. G06K 7/0008; G06K 7/10336; H03J 2200/10; G08B 13/2402; G01S 13/753; G01S 13/758
USPC ............. 340/10.1, 10.3, 10.33, 10.34, 572.1, 340/572.4; 342/42; 343/745, 703
See application file for complete search history.

(56) References Cited

U.S. PATENT DOCUMENTS

| | | | |
|---|---|---|---|
| 5,337,063 A | 8/1994 | Takahira | |
| 5,680,106 A | 10/1997 | Schrott et al. | |
| 6,070,803 A * | 6/2000 | Stobbe | G01S 13/753 235/384 |
| 6,317,027 B1 * | 11/2001 | Watkins | G06K 7/0008 340/10.1 |
| 6,343,744 B1 | 2/2002 | Shibata et al. | |
| 6,970,141 B2 * | 11/2005 | Copeland | G06K 7/10336 340/572.7 |
| 7,132,946 B2 | 11/2006 | Waldner et al. | |
| 7,259,649 B2 | 8/2007 | Ancey et al. | |
| 9,197,194 B2 | 11/2015 | Reedy et al. | |
| 2002/0097153 A1 | 7/2002 | Youbok et al. | |
| 2004/0113790 A1 | 6/2004 | Hamel et al. | |
| 2005/0212707 A1 * | 9/2005 | Egbert | G06K 19/07749 343/702 |
| 2006/0220863 A1 * | 10/2006 | Koyama | G08B 13/2402 340/572.1 |

(Continued)

OTHER PUBLICATIONS

Oct. 19, 2017 Search Report issued in European Patent Application No. 17176509.2.

*Primary Examiner* — Firmin Backer
*Assistant Examiner* — Munear Akki
(74) *Attorney, Agent, or Firm* — Oliff PLC; R. Brian Drozd (57) ABSTRACT

Systems and methods for compensating for interference in radiofrequency identification (RFID) devices are provided. One system includes an RFID antenna structure having a fixed antenna having a plurality of loops, one or more additional inductive loops and a switching arrangement coupled with the one or more additional inductive loops. The RFID antenna structure further includes a controller configured to control the switching arrangement to selectively switch the one or more additional inductive loops to change an inductance of the fixed antenna.

20 Claims, 10 Drawing Sheets

(56) References Cited

U.S. PATENT DOCUMENTS

| | | | |
|---|---|---|---|
| 2007/0284451 A1* | 12/2007 | Uramoto | G06K 19/0723 |
| | | | 235/492 |
| 2007/0285255 A1 | 12/2007 | Tsushima et al. | |
| 2007/0290856 A1 | 12/2007 | Martin | |
| 2009/0033467 A1* | 2/2009 | Finocchiaro | H04B 5/00 |
| | | | 340/10.1 |
| 2009/0072628 A1* | 3/2009 | Cook | H01Q 7/005 |
| | | | 307/104 |
| 2009/0152362 A1* | 6/2009 | Ayala | G06K 7/10178 |
| | | | 235/492 |
| 2009/0167699 A1* | 7/2009 | Rosenblatt | G06F 3/044 |
| | | | 345/173 |
| 2010/0117454 A1* | 5/2010 | Cook | G06K 7/0008 |
| | | | 307/104 |
| 2010/0134256 A1* | 6/2010 | Mihota | H04B 3/142 |
| | | | 340/10.1 |
| 2011/0266883 A1* | 11/2011 | Eray | H01Q 1/2225 |
| | | | 307/104 |
| 2013/0200151 A1* | 8/2013 | Backes | H01Q 1/2216 |
| | | | 235/439 |
| 2014/0070884 A1* | 3/2014 | Gramegna | H03F 1/565 |
| | | | 330/144 |
| 2014/0125275 A1 | 5/2014 | Low et al. | |
| 2014/0210406 A1 | 7/2014 | Na et al. | |
| 2014/0266966 A1* | 9/2014 | Rivera | H01Q 7/00 |
| | | | 343/867 |
| 2015/0333404 A1 | 11/2015 | Li et al. | |
| 2016/0380365 A1* | 12/2016 | Helbers | H04B 1/40 |
| | | | 455/73 |

* cited by examiner

| METAL PLATE TO ANTENNA DISTANCE [mm] | SWITCH 212 | SWITCH 210 | ANTENNA INDUCTANCE RANGE [µH] | S11 MATCHING [dB] | QUALITY Q | SRF [MHz] | CARD DETECTION RANGE MIFARE CLASSIC CARD [mm] |
|---|---|---|---|---|---|---|---|
| 6...8 | OPEN | OPEN | 1...1,08 | >3dB | 20...40 | >55 | >60...80 |
| 8...13 | OPEN | CLOSE | IN ALL CASES | IN ALL CASES | IN ALL CASES | IN ALL CASES | IN ALL CASES |
| 13...INFINITE | CLOSE | OPEN | | | | | |

SYSTEMS AND METHODS FOR COMPENSATION OF INTERFERENCE IN RADIOFREQUENCY IDENTIFICATION (RFID) DEVICES

BACKGROUND

Radiofrequency Identification (RFID) systems are widely used in many different applications. For example, RFID systems that include associated readers allow individuals to access buildings and electronic services (such as arming and disarming alarm systems) using an RFID card associated with that individual that may be read by the RFID reader.

As the use of RFID systems increases and the design of the card readers becomes more compact, including smaller and thinner readers, the impact to performance of these readers from environmental influences will likely increase. For example, card readers will likely be installed in many different locations and on many different types of surfaces, such as on walls of a building, on wooden door frames and on conducted wall surfaces, among other surfaces. While non-conducting surfaces, such as wood and stone, on which these RFID readers may be mounted do not affect the performance of the readers, when the readers are mounted on conducting surfaces, such as surfaces that include metal (e.g., copper or aluminum), the performance of the readers can be adversely affected. In particular, conducted surfaces, such as copper, aluminum or steel can have a negative impact on the magnetic field distribution of the card reader antenna. This negative impact can result in, for example, decreased card reader detection range. Thus, these card readers do not always provide acceptable performance independent of the nature of the surface on which the card readers are mounted.

SUMMARY

To overcome these and other challenges, aspects of broad inventive principles are disclosed herein.

In one embodiment, radiofrequency identification (RFID) antenna structure is provided that includes a fixed antenna having a plurality of loops, one or more additional inductive loops and a switching arrangement coupled with the one or more additional inductive loops. The RFID antenna structure further includes a controller configured to control the switching arrangement to selectively switch the one or more additional inductive loops to change an inductance of the fixed antenna.

In another embodiment, a radiofrequency identification (RFID) reader is provided that includes a frequency generator configured to generate a carrier frequency signal, an LC-matching circuit coupled to an output of the frequency generator and an antenna coupled to an output of the LC-matching circuit and having one or more switchable inductive coils. The RFID reader also includes a controller coupled with the antenna and configured to control the one or more switchable inductive coils of the antenna based on a surrounding conducted environment affecting an impedance of the antenna.

In another embodiment, a method for compensating for a conducted environment in radiofrequency identification (RFID) is provided. The method includes selectively switching one or more inductive loops to resonantly couple the one or more inductive loops with a fixed antenna of an RFID device to change the resonant operation of the antenna based on the conducted environment

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various embodiments may include an RFID system having an RFID reader, such as a mountable card reader that compensates for the negative behavior of the card reader from surrounding conductive environments (e.g., conductive materials, such as metal that form the surface on which the reader is mounted). It should be noted that while the various embodiments are described in connection with an RFID card reader having particular operating characteristics, the various embodiments are not limited to a particular RFID reader or any particular operating environment. Thus, one or more embodiments may be used in connection with different RFID card readers or other devices in an RFID setting that are affected by the surrounding environment, especially a conductive environment.

As described in more detail herein, one or more embodiments provide systems and methods to compensate for the effect of a conducted environment on RFID devices. These embodiments may include the use of one or more switching inductances for designing an antenna for a contactless card reader, wherein switches are used as controls for inductance based on the types of surfaces on which the card reader is mounted and the distance between, for example, the metal (in the surface) and the antenna within the card reader. In particular, in various embodiments, a control arrangement for maintaining a same inductance value for the readers operating in different environments (e.g., mounted on different conductive surfaces) is provided by using inductance switching to control the variance in the inductance value of an antenna of the reader for different installation surfaces.

Figure 1:
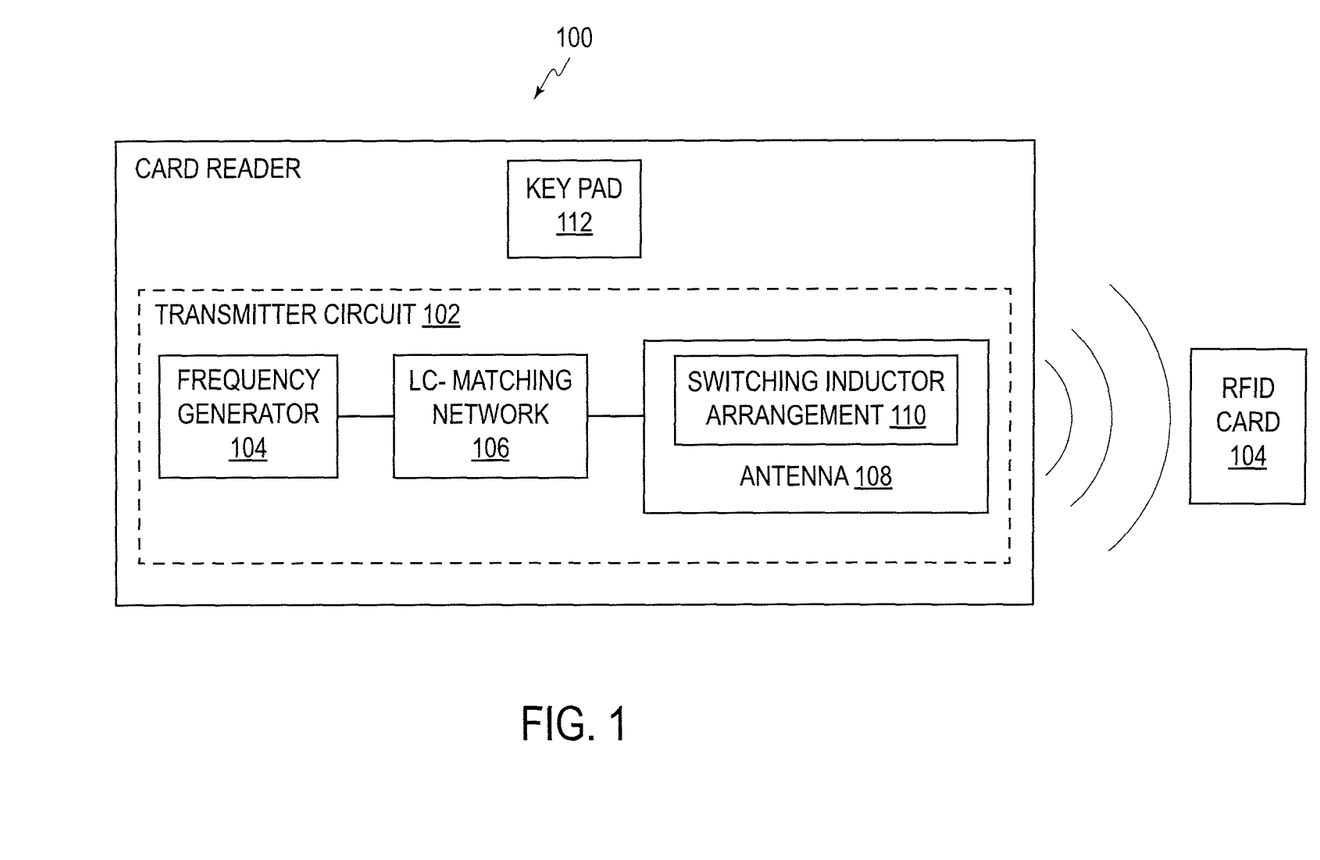
FIG. 1 is a block diagram illustrating a system according to one or more embodiments.

One embodiment of a RFID card reader system 100, which may be configured, for example for use in authentication or identification, includes a transmitter circuit 102 that is configured to transmit RFID signals to read an RFID card 104. The transmission of RFID signals and the reading of the RFID card 104 may be performed using one or more different RFID transmission and reading techniques as should be appreciated by one of ordinary skill in the art. The transmitter circuit 102 includes a frequency generator 104 connected to an LC-matching network 106 connected to an antenna 108. The RFID card reader system 100 may also include a keypad 112 (e.g., alphanumeric keypad) that is configured to receive one or more user inputs (e.g., an additional password).

In one or more embodiments, the frequency generator 104 is configured to generate a carrier frequency signal (e.g., 9 MHz, 13.56 MHz or 25 MHz), which is the operating frequency of RFID card reader system 100, which signal then passes through the LC-matching network 106 for impedance matching to an antenna 108. As described herein, the antenna 108 in various embodiments is a switchable inductance antenna including a switching inductor arrangement 110 that forms a variable antenna resonance circuit, such that the antenna $L_{p,s}$ includes multiple wired loops that generate magnetic flux. By switching in one or more wired loops, the antenna 108 is capable of operating with the same inductance (e.g., 0.94 µH (micro-Henry)) for different kinds of installation surfaces and at the same distances, such that the detection range is slightly reduced. It should be noted that the resonance frequency is generally defined as:

$$f_{res} = \frac{1}{2\pi\sqrt{L_{p,s} * C_{p,s}}} \quad (1)$$

where $L_p$ or $L_s$ is the antenna inductance and $C_s$ or $C_p$ is the resonance capacitance. $L_{p,s}$ and $C_{p,s}$ work together in a well-tuned circuit together with the LC-matching network with a switchable inductance, such that the RFID card reader system 100 operates on $f_{res}$ within desired or required performance characteristics in a desired or required card detection range (in different conducted environments).

Figure 2:
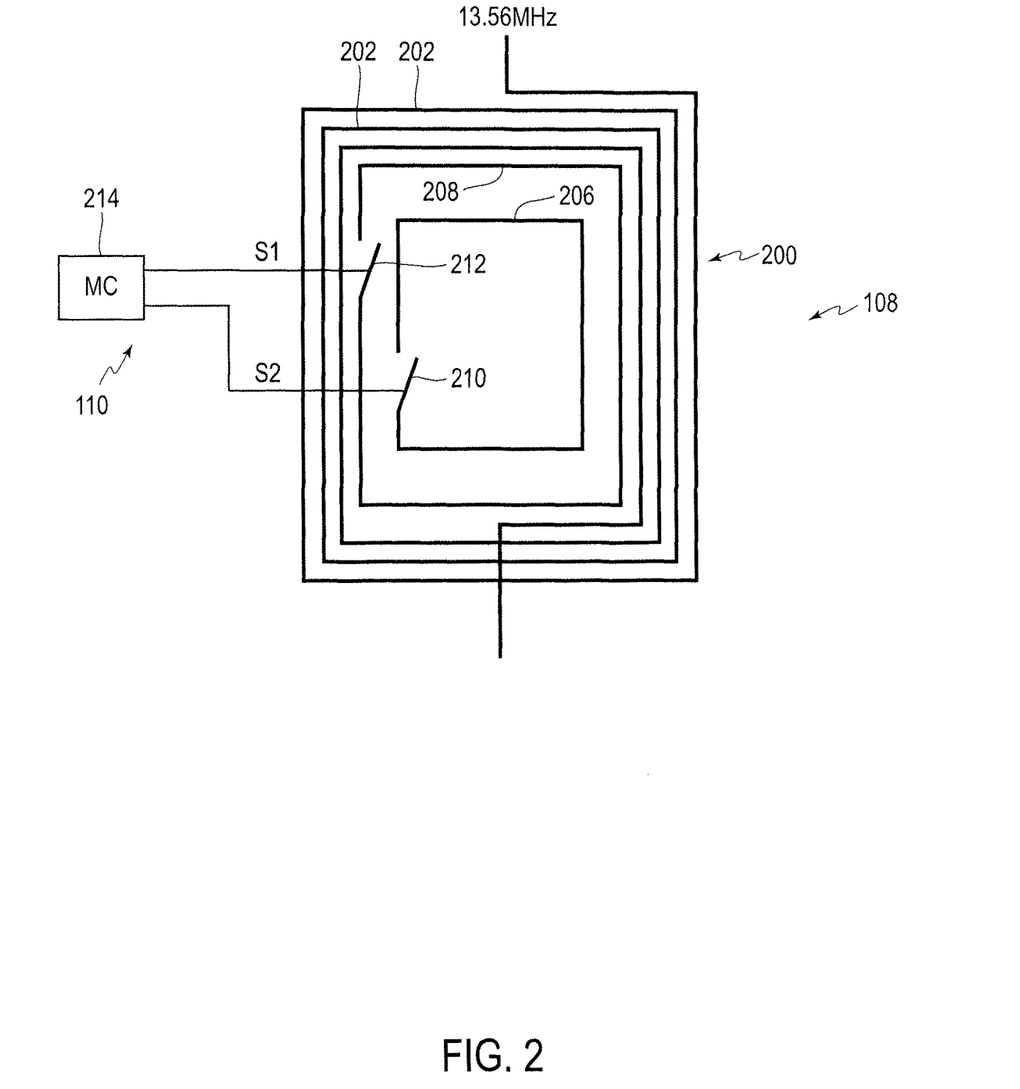
FIG. 2 is a diagram illustrating an antenna configuration according to one or more embodiments.

One embodiment of the antenna 108 with the switching inductor arrangement 110 is illustrated in FIG. 2. As can be seen, a fixed antenna 200 is provided, which is a multiple loop wired antenna. It should be noted that the number of loops 202 is illustrated for example only and additional or fewer loops may be provided, such as based on the desired or required resonant operating frequency of the RFID card reader system 100. Additionally, the size, shape and spacing between the loops 202 may be varied as desired or needed. In the illustrated embodiment, the antenna 108 is configured for operation at 13.56 MHz (e.g., for use with a MIFARE card reader).

The antenna 108 further includes the switching inductor arrangement 110, which in the illustrated embodiment has two additional antenna loops 206 and 208 (also referred to as loops), which may be selectively and independently switched into and out of the antenna 108 by switches 210 and 212, respectively. Thus, the loops 206 and 208 may be included as part of or removed from the antenna 208 as desired or needed to affect the overall inductance of the antenna 108, such as to compensate for a conductive environment that is affecting the operating resonance of the antenna 108. For example, the loops 206 and 208 may be actively switched into and out of the antenna 108 to adjust the resonance frequency of the antenna 108, such that the antenna 108 is able to properly and consistently operate at 13.56 MHz (or other desired frequency) regardless of the surrounding conductive environment.

It should be noted that although two loops 206 and 208 are illustrated in FIG. 2, additional or fewer loops may be provided and positioned at different locations relative to the fixed antenna 200. For example, the number, size and spacing of the additional loops, such as the loops 206 and 208 relative to each other and to the fixed antenna 200 may be changed as desired or needed (e.g., to compensate for different types of conductive environments), such that the loops 206 and 208 or other loops, may be positioned within the inner most loop winding of the fixed antenna 200 or at other locations. In various embodiments, the loops 206 and 208 are physically (and or electrically) separated from the loops 202.

Thus, the loops 206 and 208 in various embodiments provide an inductance switching capability for the antenna 108 that allows for mounting of the RFID card reader system 100 onto different surfaces having different conductive operating environments. The inductance of the antenna 108 may be varied by switching the switches 210 and/or 212, which causes a change in the resonant operation of the antenna 108 by switching in and out the one or more loops 206 and 208. For example, a controller 214 (such as a micro-controller) may be provided to control the opening and closing of the switches 210 and 212.

Provided below are test examples, wherein when the switch 210 or 212 is indicated as off, it means that the switch is open (and the corresponding loop 206 and 208 is not part of the antenna 108) and when a switch is indicated as on, it means that the switch is closed (and the corresponding loop 206 and 208 is part of the antenna 108). Thus, as can be seen in Table 1 below, the measured inductance depends of the switching states of the switches 210 and 212.

TABLE 1

| Measured Inductance L | Measured Resistance R | Switch 210 | Switch 212 |
|---|---|---|---|
| $L_{11}$ = 0.92 µH | $R_{11}$ = 2.2Ω | ON (1) | ON (1) |
| $L_{01}$ = 0.94 µH | $R_{01}$ = 2.3Ω | OFF (0) | ON (1) |
| $L_{10}$ = 1.17 µH | $R_{10}$ = 2.4Ω | ON (1) | OFF (0) |
| $L_{00}$ = 1.39 µH | $R_{00}$ = 2.3Ω | OFF (0) | OFF (0) |

The following Table 2 illustrates test results with a copper plate positioned under the antenna 108 at a distance of six millimeter (6 mm).

TABLE 2

| Measured Inductance L | Measured Resistance R | Switch 210 | Switch 212 |
|---|---|---|---|
| $L_{11C}$ = 0.761 µH | $R_{11C}$ = 1.6Ω | ON (1) | ON (1) |
| $L_{01C}$ = 0.767 µH | $R_{01C}$ = 1.6Ω | OFF (0) | ON (1) |
| $L_{10C}$ = 0.893 µH | $R_{10C}$ = 1.6Ω | ON (1) | OFF (0) |
| $L_{00C}$ = 0.943 µH | $R_{00C}$ = 1.5Ω | OFF (0) | OFF (0) |

The following Table 3 illustrates test results with an aluminum plate positioned under the antenna 108 at a distance of six millimeter (6 mm).

TABLE 3

| Measured Inductance L | Measured Resistance R | Switch 210 | Switch 212 |
|---|---|---|---|
| $L_{11A}$ = 0.761 µH | $R_{11A}$ = 1.7Ω | ON (1) | ON (1) |
| $L_{01A}$ = 0.765 µH | $R_{01A}$ = 1.7Ω | OFF (0) | ON (1) |
| $L_{10A}$ = 0.891 µH | $R_{10A}$ = 1.8Ω | ON (1) | OFF (0) |
| $L_{00A}$ = 0.941 µH | $R_{00A}$ = 1.5Ω | OFF (0) | OFF (0) |

The following Table 4 illustrates test results with an iron plate positioned under the antenna 108 at a distance of six millimeter (6 mm).

TABLE 4

| Measured Inductance L | Measured Resistance R | Switch 210 | Switch 212 |
|---|---|---|---|
| $L_{11I}$ = 0.765 µH | $R_{11I}$ = 2.0Ω | ON (1) | ON (1) |
| $L_{01I}$ = 0.771 µH | $R_{01I}$ = 2.0Ω | OFF (0) | ON (1) |
| $L_{10I}$ = 0.899 µH | $R_{10I}$ = 2.1Ω | ON (1) | OFF (0) |
| $L_{00I}$ = 0.949 µH | $R_{00I}$ = 2.2Ω | OFF (0) | OFF (0) |

The following Table 5 illustrates test results with a Mu-metal plate positioned under the antenna 108 at a distance of six millimeter (6 mm).

TABLE 5

| Measured Inductance L | Measured Resistance R | Switch 210 | Switch 212 |
|---|---|---|---|
| $L_{11M}$ = 0.784 µH | $R_{11M}$ = 4.1Ω | ON (1) | ON(1) |
| $L_{01M}$ = 0.790 µH | $R_{01M}$ = 4.3Ω | OFF (0) | ON(1) |
| $L_{10M}$ = 0.931 µH | $R_{10M}$ = 5.7Ω | ON (1) | OFF (0) |
| $L_{00M}$ = 0.995 µH | $R_{00M}$ = 7.0Ω | OFF (0) | OFF (0) |

Thus, using the following condition: L01=L00C=L00A=L00I (<L00M), various embodiments provide an antenna 108 with the same inductance (in the above test example: 0.94 µH) for different kinds of installation surfaces and at the same distances (which only depends on the switch 212). For example, various embodiments can be used to compensate for a conductive environment when using a MIFARE card reader which can then be installed, for example, in any metal environment.

Additionally, the switch 210 in various embodiments is used to correct the inductor variances if, for example, the metal plate only covers a part of the antenna 108. In this case, the inductance of the antenna 108 can be adjusted to $L_{10}$ defined as: $L_{11}<L_{01}<L_{10}<L_{00}$. As discussed herein and as should be appreciated, additional loops or wired turns can divide the antenna inductance into several more ranges. It should also be noted that for all the test results, except for the Mu-metal plate, a lower resistance loss was measured as follows: $R_C<R_A<R_I<R$ ($<R_M$) where:

$R_C$: copper plate
$R_A$: aluminum plate
$R_I$: iron plate
R: no metal plate e.g. stone, wood, concrete etc.
$R_M$: Mu-metal plate (not usually used as an installation ground)

It should be noted that the switches 210 and 212 may be different types of switches. For example, in some embodiments, the switches 210 and 212 can be any type of switching devices, such as using one or more field-effect transistors (FETs), wherein a resistor may be provided to adjust the Q-factor of the resonance of the antenna 108 in the case of a closed FET.

Thus, in accordance with various embodiments, the switching inductor arrangement 110 may be designed to compensate for the surrounding metal environment that affects the resonance operation of the antenna 108. For example, in one embodiment, an antenna arrangement is provided that includes the fixed antenna 200 with the additional switchable loops 206 and 208. The design of the switching inductor arrangement 110 may be provided by first positioning a metal plate (or other conducting material that may be present at a future site of mounting) at an antenna distance from the RFID card reader system 100 based on a later desired mounting location (e.g., 6 mm from the antenna 108). Then, the antenna inductance is measured by opening the switches 210 and 212 to determine the inductance ($L_{00Mplate}$). The metal plate is then removed and the antenna inductance ($L_{01}$) is measured by switching switch 212 on (switch 210 is open and off). The desired condition is then $L_{01}=L_{00Mplate}$ or $L_{01}=L_{00C}=L_{00A}=L_{00I}$. If the condition is not met then the following may be performed:

(i) if the measured antenna inductance $L_{01}<L_{00Mplate}$, increase the area of the inner turn; or
(ii) if the measured antenna inductance $L_{01}>L_{00Mplate}$, decrease the area of the inner turn, until the condition is fulfilled.

If an additional inductance step is desired or needed, the area of the loop 206 may be increased or decreased until the desired inductance $L_{10}$ is achieved (with switch 210 closed and switch 212 open). Accordingly, the antenna 108 can be designed based on desired operating conditions for a particular mounting surface.

Thus, by selectively switching one or more of the switches 210 and 212, the impedance ($L_{Ant}$) of the antenna 108 is changed, such as to compensate for a surrounding conductive environment, wherein:

$$L_{Ant}(S \text{ is closed}) = L_{\sigma 1} + \frac{L_h * \ddot{u}^2 L_{\sigma 2}}{L_h + \ddot{u}^2 L_{\sigma 2}}$$

in the case of a closed switch.

Therefore, $L_{Ant}$(S is closed)<$L_{Ant}$(S are open).

By using one or more embodiments, a desired Q-factor, such as 30-40 can be met both in conducting and non-conducting environments. It should be noted that in the conducting environment, metal plates have a negative influence on the detection range due to a worse field distribution and field losses. This effect can be partially compensated for with a better Q-factor.

By practicing one or more embodiments, a constant card reader detection range may be provided for different operating conditions. Thus, the RFID card reader system 100 can be installed in different environments and on different types of installation surfaces. For example, in some embodiments, the RFID card reader system 100 can be installed in and coupled with different conductive or non-conductive surfaces and provide a card detection range of at least 20 mm. In some embodiments, the RFID card reader system 100 has a design with a very small distance from the antenna 108 to the wall (e.g., 6 mm or less) and can operate when mounted to a structure or surface formed from one or more different materials (e.g., stone, wood, aluminum, copper, iron, brass or reinforced concrete). In this environment, one or more embodiments of the RFID card reader system 100 provide the following operating characteristics:

(i) antenna inductance: 300 nH . . . 3 μH (number of loop turns: N=1-6)

(ii) antenna quality factor: <40

(iii) self-resonance frequency: >35 MHz

For example, in various embodiments, the RFID card reader system 100 is configured to operate while providing a resonance matching for a range of antenna inductance of 1.0 μH to 1.4 μH including one or more additional loops, which may be determined based on the distance to the conducting material (e.g., metal plate). In operation, the switches 210 and 212 can be used to compensate for inductance variations until the inductance is almost constant for the different operating environments. For example, the switches 210 and 212 are used to adjust the resonance frequency of the RFID card reader system 100 to provide a desired or correct resonance frequency, such as in the case of an approached metal plate. The switching operation may be used to tune the LAnt, wherein switchable or shiftable inductors control the magnetic flux directly within the antenna 108.

Figure 3:
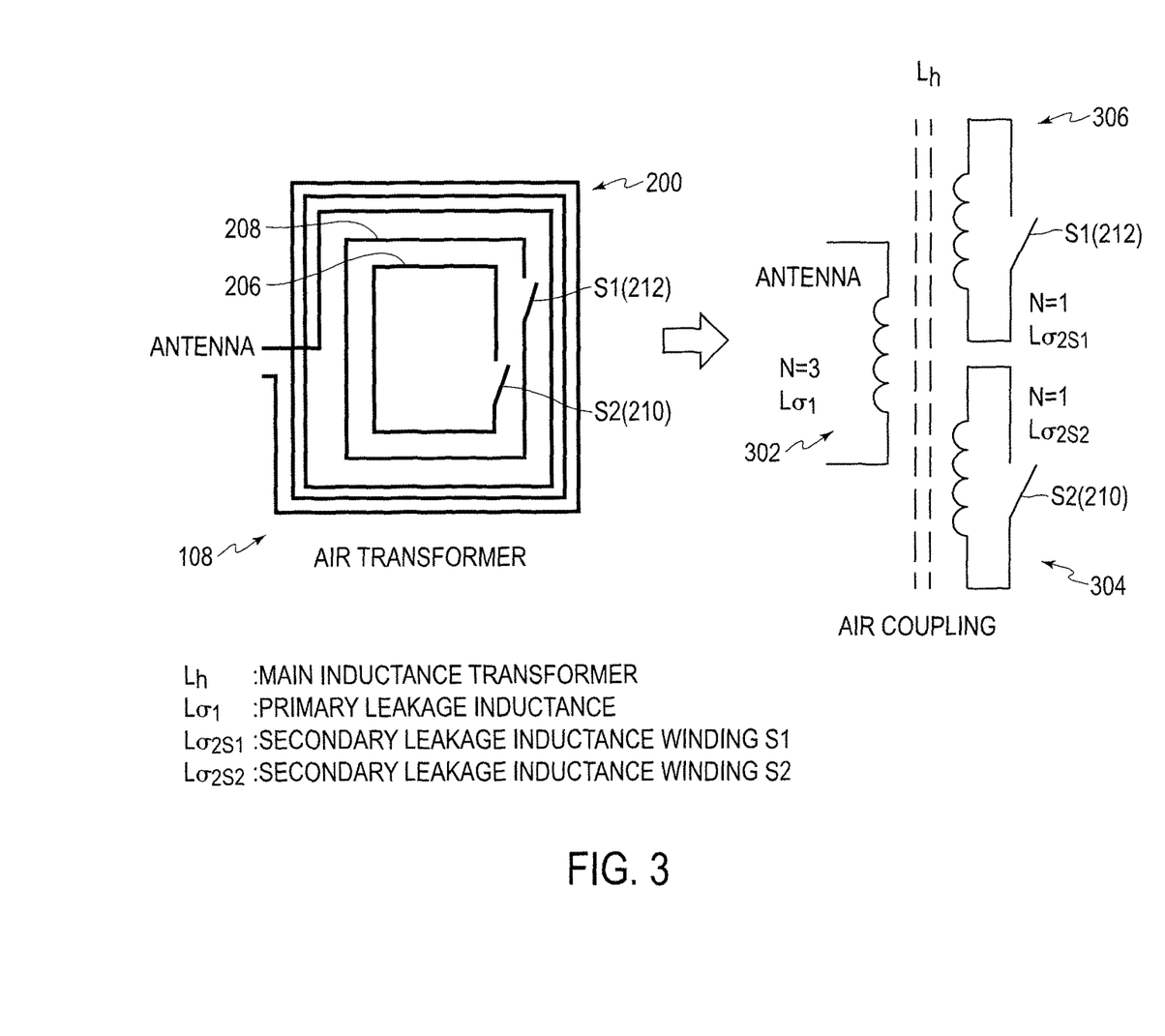
FIG. 3 is an equivalent circuit diagram of an antenna configuration according to one or more embodiments.
Figure 4:
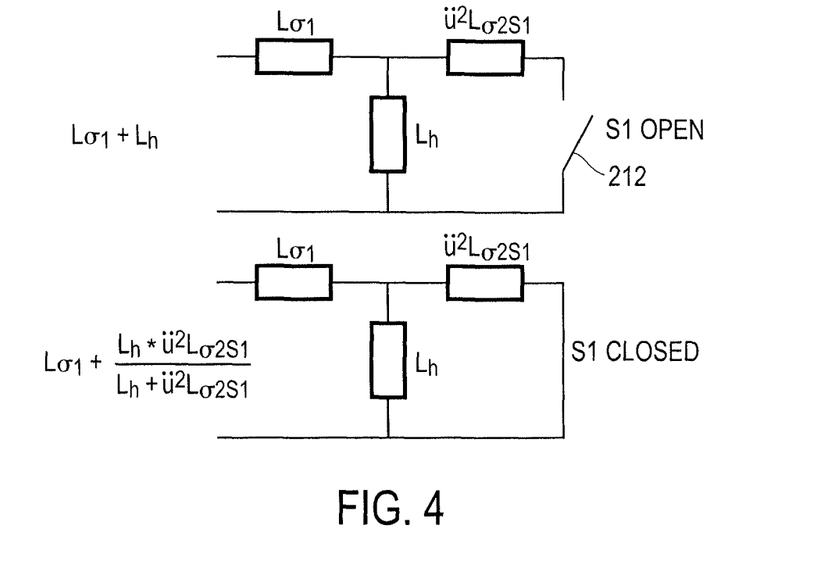
FIGS. 4 and 5 are equivalent circuit diagrams illustrating inductances according to one or more embodiments.
Figure 5:
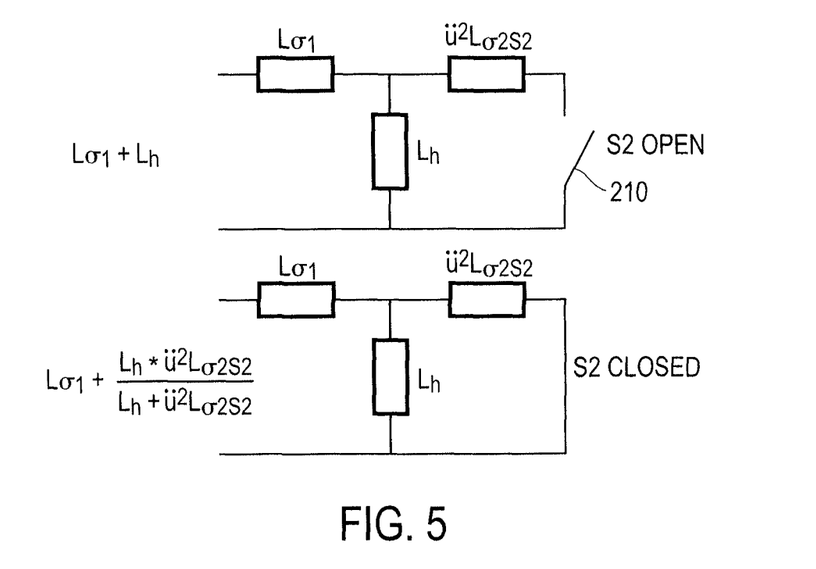

FIG. 3 illustrates a switchable inductor configuration by means of a transformer equivalent circuit 300. As can be seen, the antenna 108 is represented by a main coil 302 and the loops 206 and 208 are represented by the secondary coils 304 and 306. FIGS. 4 and 5 illustrate the conditions when the switches 210 and 212 are selectively opened and closed. As can be seen in FIGS. 4 and 5, with the switch 212 or 210 open, the inductance is defined by: Lσ1+Lh.

With the switch 212 closed, the inductance is defined by:

$$L_{\sigma 1} + \frac{L_h * \ddot{u}^2 L_{\sigma 2 S 1}}{L_h + \ddot{u}^2 L_{\sigma 2 S 1}}$$

With the switch 210 closed, the inductance is defined by:

$$L_{\sigma 1} + \frac{L_h * \ddot{u}^2 L_{\sigma 2 S 2}}{L_h + \ddot{u}^2 L_{\sigma 2 S 2}}$$

Thus, as should be appreciated, if the switch 210 or the switch 212 is closed, the inductance of the antenna 108 changes due to the leakage inductances Lσ2. It should be noted that in various embodiments, both of the switches 210 and 212 are not closed at the same time.

In operation, by selectively switching the switches 210 and 212, a constant antenna inductance may be provided in different operating environments, including when the RFID card reader system 100 is mounted in a metal environment. For example, as illustrated in the graph 600 of FIG. 6, wherein the vertical axis represents measured inductance and the horizontal axis represents the distance in millimeters to a metal plate, the curve 602 illustrates an inductance that can be maintained substantially constant in a conductive environment and at different distances from the metal interference (e.g., metal plate) using one or more embodiments described herein. For example, the curve 602 may represent a configuration in which the inductance range is provided by an auto-tuning configuration wherein the controller 214 (shown in FIG. 2) operates by using feedback to maintain a constant impedance within a desired range (e.g., within 0.1 μH of 1 μH or 1.02 μH, which is desired for optimized impedance matching in some applications) by switching the switches 210 and 212. For example, using a lookup table, the controller 214 may selectively switch the switches 210 and 212 to adjust for a metal environment at defined distances from the antenna 108 of the RFID card reader system 100. However, in other embodiments, a user input (user switching) may be provided.

Figure 6:
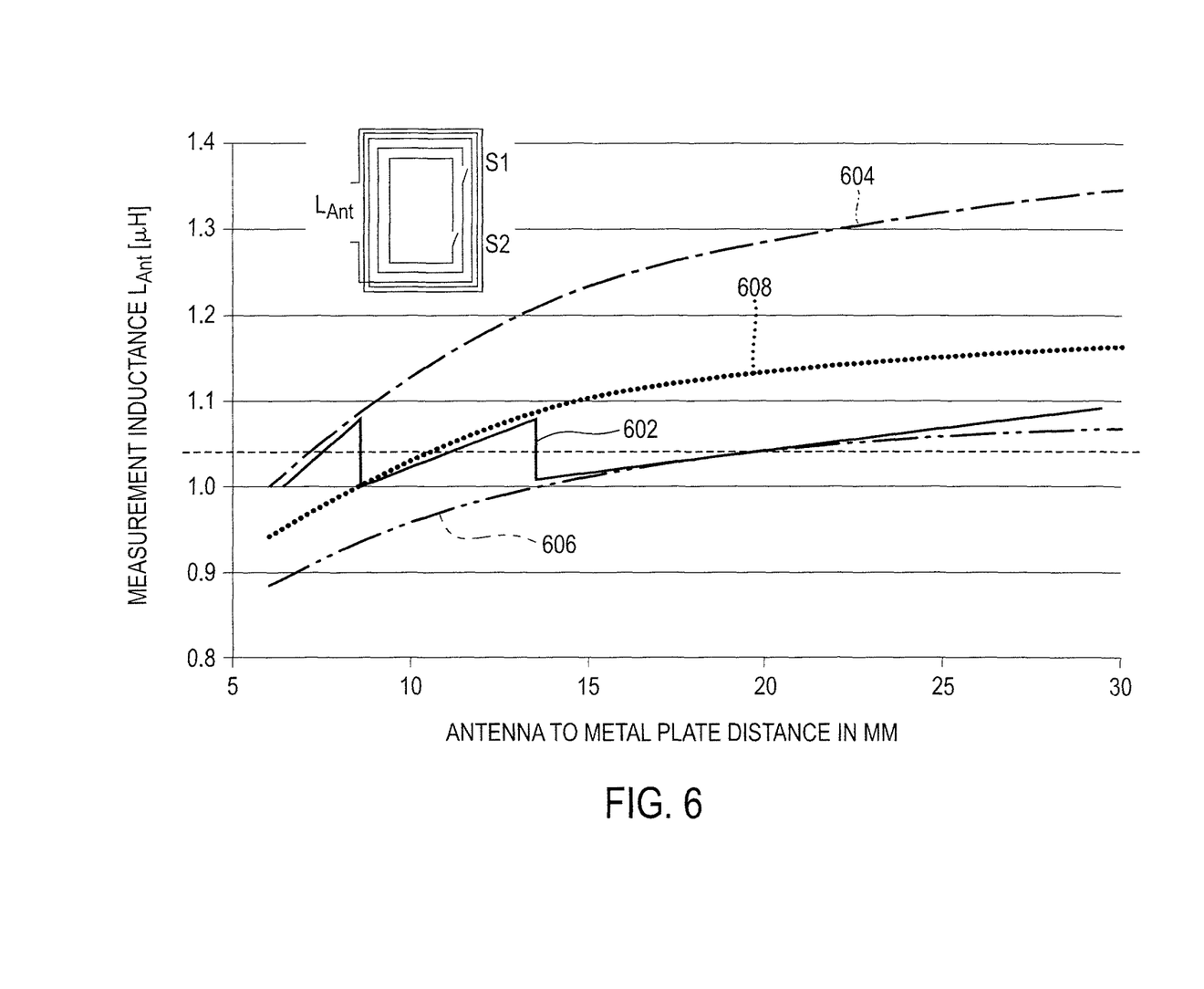
FIG. 6 is a graph showing measured inductances.

It should be noted that the curve 604 represents the measured inductance when both of the switches 210 and 212 are open. The curve 606 represents the measured inductance when the switch 210 is open and the switch 212 is closed. The curve 608 represents the measured inductance when the switch 210 is closed and the switch 212 is open.

Figure 7:
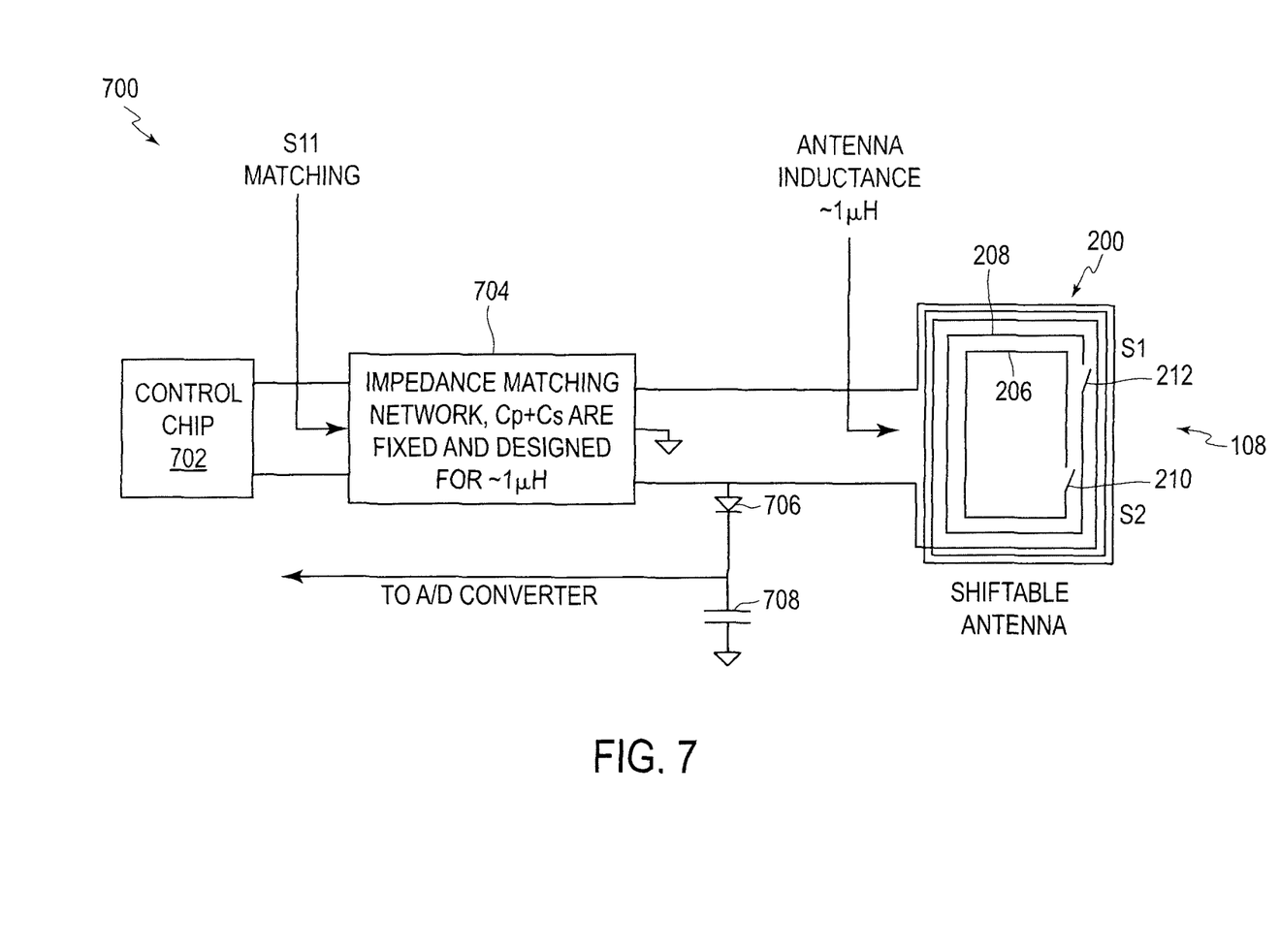
FIG. 7 is a block diagram of an auto-tuning configuration according to one or more embodiments.
Figure 8:
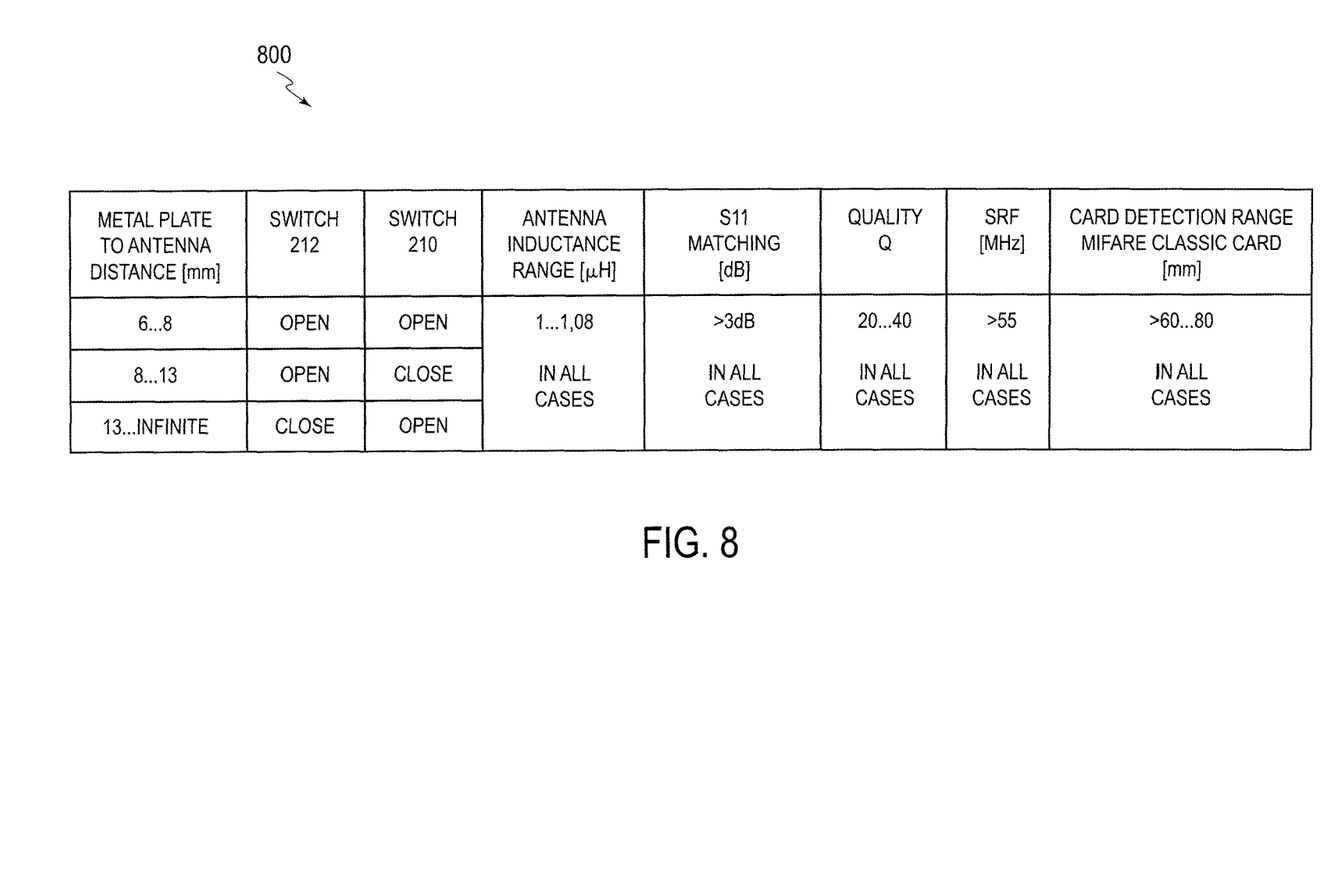
FIG. 8 is a table illustrating a control arrangement for an auto-tuning configuration according to one or more embodiments.

One embodiment provides an auto-tuning antenna configuration 700 as illustrated in FIG. 7. It should be noted that like numerals represent like parts in the various figures. In this embodiment, a controller 702, illustrated as a control chip (e.g., a PN512 MIFARE Chip) is connected to an impedance matching network 704, the output of which is connected to the antenna 108. In this illustrated embodiment, the impedance matching network 704 is connected to the antenna 108 and to an A/D converter via a diode 706 and capacitor 708. The auto-tuning antenna configuration 700 is configured to operate at about 1 μH using the controller 702 configured as shown in table 800 illustrated in FIG. 8. The table 800 illustrates the different conditions for each of the switch states and shows that an acceptable card detection range is maintained when the card reader is mounted in a metal environment.

Figure 9:
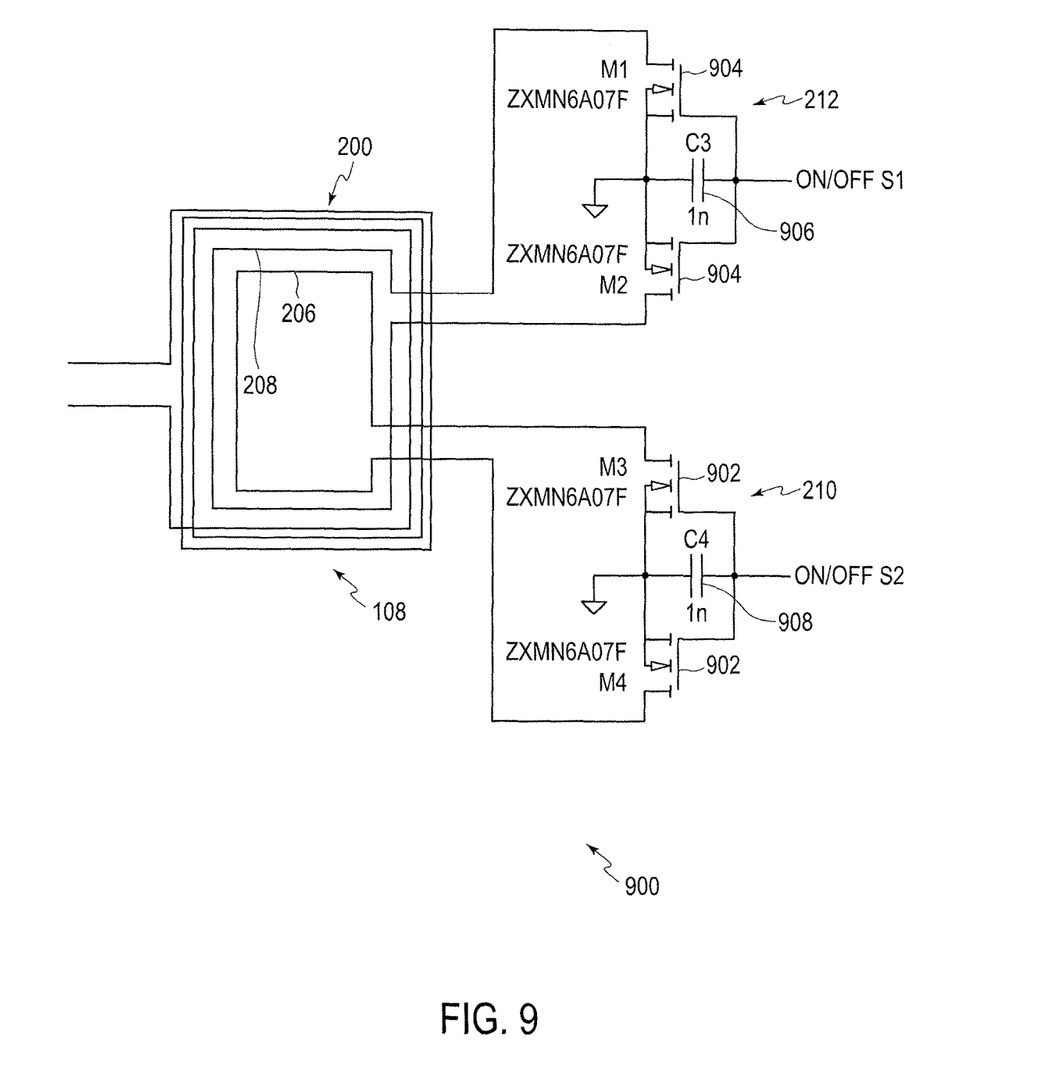
FIG. 9 is a diagram of a switching arrangement according to one or more embodiments.

FIG. 9 illustrates a switching arrangement 900, which may be embodied as the switches 210 and 212. In the illustrated embodiment, the switches 210 and 212 are provided by a pair of metal-oxide-semiconductor (MOS) transistors 902 and 904 having a low resistance. A capacitor 906 and 908 is connected between the MOS transistors 902 and 904, respectively, to maintain the voltage constant at the gates of the MOS transistors 902 and 904. In some embodiments, the switching arrangement 900 has the following operating characteristics: RDSon<200 mOhm (low output capacitance) and VDS=60V/IDS=1.4 A.

It should be noted that electronic switching is only one example of a switching arrangement. For example, in other embodiments, different electronic switching arrangements or a mechanical switching arrangement may be provided. Additionally, the switching may be performed manually, automatically or semi-automatically.

Thus, various embodiments provide an antenna arrangement, such as for the RFID card reader system 100 that compensates for the impact or adverse effect of a conducted environment. However, it should be appreciated that one or embodiments may be provided to compensate for the impact or adverse effect of a conducted environment in different RFID applications.

Figure 10:
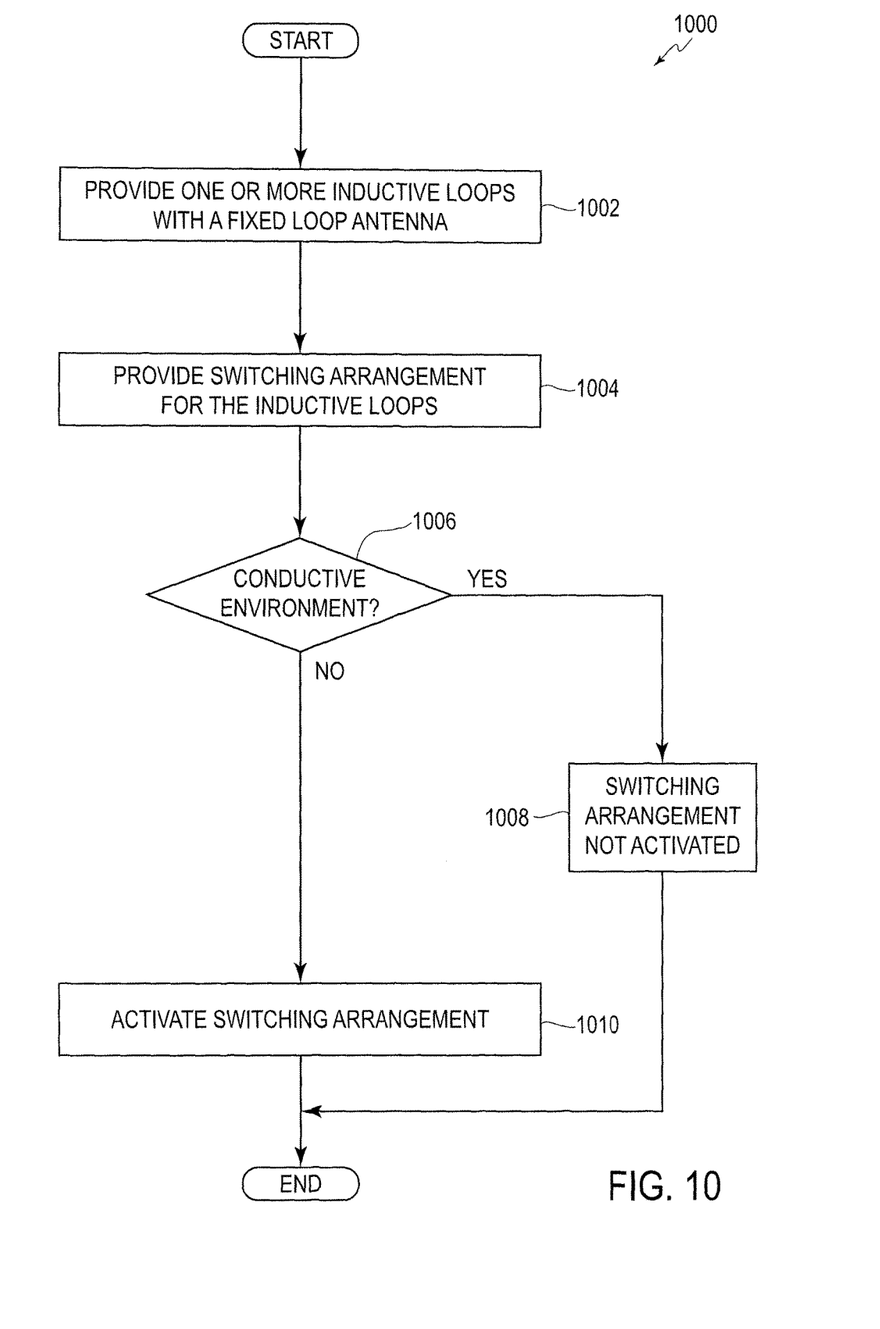
FIG. 10 is a flowchart of a method according to one or more embodiments.

A method 1000 for compensating for a conducted or conductive environment in RFID applications is shown in FIG. 10. The method 1000 includes providing one or more inductive loops with a fixed loop antenna at 1002. For example, the loops 206 and 208 may be provided within the inner loop of the fixed antenna 200 as described herein. The method 1000 also includes providing a switching arrangement for the inductive loops at 1004. For example, the switches 210 and 212 may be provided with the loops 206 and 208 to allow for selective and independent switching of the inductive loops.

With a configuration having the one or more inductive loops with a fixed loop antenna and the switching arrangement, a determination is then made at 1006 whether the antenna structure including the one or more inductive loops with a fixed loop antenna and the switching arrangement is provided within a conducted or conductive environment at 1006. For example, the one or more inductive loops with a fixed loop antenna and the switching arrangement may form part of the RFID card reader system 100 that is mounted to a surface having a metal plate. If a conducted or conductive environment is determined at 1006 then the switching arrangement is activated at 1010. For example, one of more of the switches 210 and 212 may be selectively turned on and off to maintain a constant impedance of the antenna structure. If a conducted or conductive environment is not determined at 1006 then the switching arrangement is not activated (at 1008).

Thus, the method 1000 may be implemented or performed using one or more systems described herein, such as the RFID card reader system 100. It should be noted that the steps of the method 1000 may be performed in a different order and some steps may be performed concurrently. Additionally, some steps may be repeated. The steps also may be performed by the controller 214, such that the controller 214 is a specialized processing machine/specialized hardware.

Figure 11:
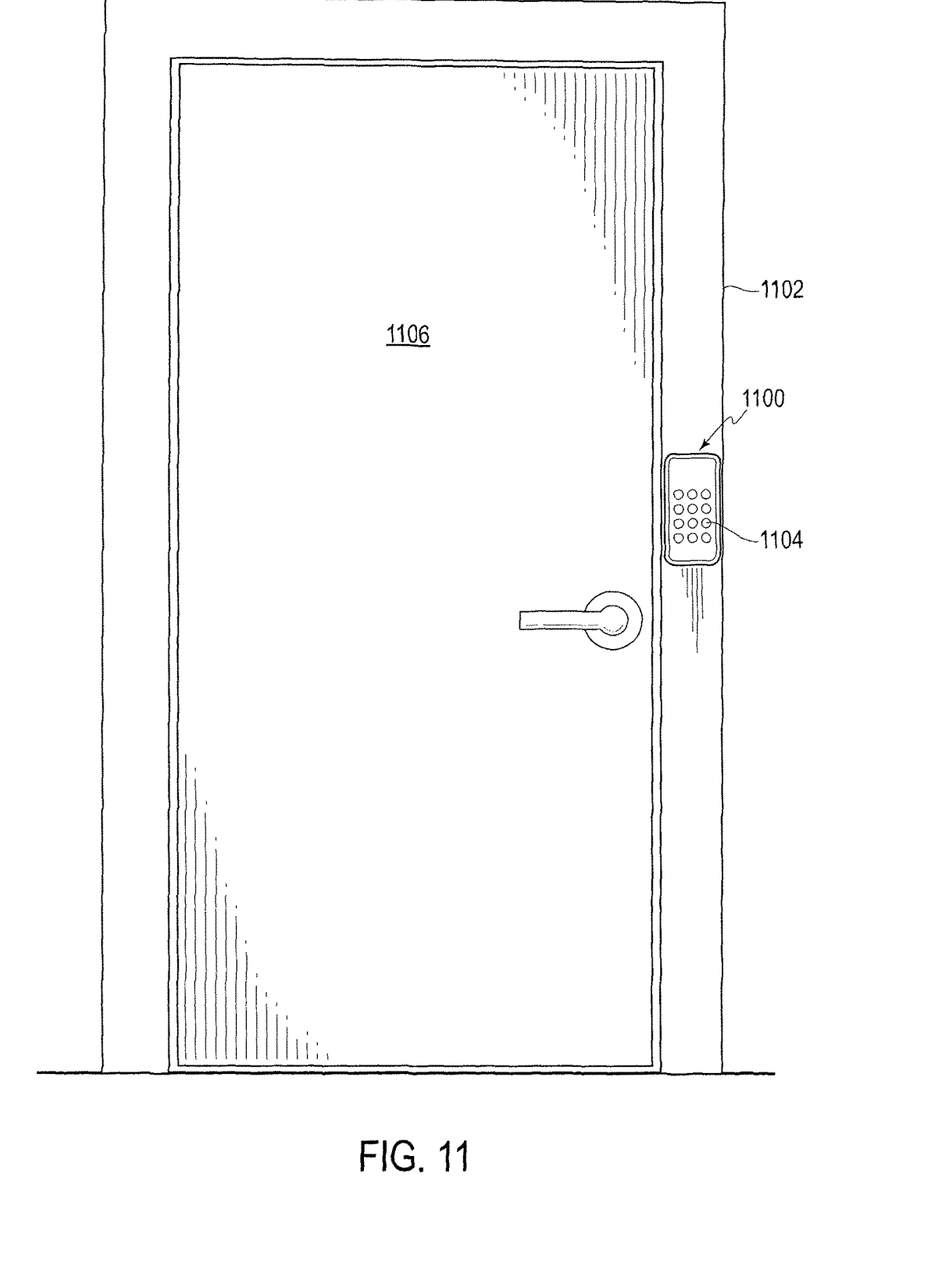
FIG. 11 is a diagram of a card read in accordance with one or more embodiments.

Various embodiments may be implemented in different applications or settings. For example, FIG. 11 illustrate a card reader 1100 (e.g., RFID card reader), which may be embodied as or include one or more elements of the RFID card reader system 100, that is mounted to a door frame 1102, which in the illustrated embodiment is a metal door frame. The card reader 1100 may include one or more user inputs 1104, which may be embodied as or include the keypad 112 (e.g., alphanumeric keypad) shown in FIG. 1. In operation, the card reader 1100 is configured to read a card (e.g., RFID or smart card) that may be carried by a person, which when authenticated, allows access through the door 1106 (e.g., which may gain access to a secure area of a building). The card reader 1100 may include the switches 210 and 212 (with connected components, e.g., two additional antenna loops 206 and 208) within the card reader 1100 to adjust for a metal environment (e.g., the metal door frame 1102) at defined distances from a fixed antenna (e.g., the antenna 108 within the card reader 1100). The card reader 1100, thus, maintains desired or required performance characteristics in a desired or required card detection range even in a conducted environment (in this example, mounted to a structure including metal).

It should be noted that one or more embodiments can comprise one or more microprocessors (which may be embodied as a processor) and a memory, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, the system 100 can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can communicate between components using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described herein with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks and when implemented in one or more embodiments, results in a transforming or converting a general purpose computer/processor/hardware to a specialized computer/processor/hardware that improves the technological art.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A radiofrequency identification (RFID) antenna structure comprising:
   an antenna for use in an RFID device, the antenna comprising a plurality of loops configured to receive a signal from a source;
   one or more additional inductive loops that are physically separated from the plurality of loops;
   a switching arrangement coupled with the one or more additional inductive loops; and
   a controller configured to control the switching arrangement to selectively switch the one or more additional inductive loops to inductively couple the one or more additional loops with the plurality of loops of the antenna to change an inductance of the antenna based on a surrounding conducted environment.

2. The RFID antenna structure of claim 1, wherein the one or more additional inductive loops comprise one or more loops positioned within the plurality of loops of the antenna.

3. The RFID antenna structure of claim 1, further comprising a plurality of additional inductive loops, wherein the controller is configured to selectively and independently switch each of the loops of the plurality of additional inductive loops to activate or deactivate each of the loops.

4. The RFID antenna structure of claim 3, further comprising at least one switch coupled with each loop of the plurality of loops.

5. The RFID antenna structure of claim 1, wherein the switching arrangement comprises at least one metal-oxide-semiconductor (MOS) transistor.

6. The RFID antenna structure of claim 1, wherein the controller is configured for auto-tuning to change the inductance of the antenna based on a surrounding conducted environment.

7. A radiofrequency identification (RFID) reader comprising:

a frequency generator configured to generate a carrier frequency signal;

an LC-matching circuit coupled to an output of the frequency generator;

an antenna system coupled to an output of the LC-matching circuit, the antenna system comprising:
an antenna, and
one or more switchable inductive coils; and a controller coupled with the antenna system and configured to control the one or more switchable inductive coils to inductively couple, while being physically separated from, the one or more switchable inductive coils with the antenna based on a surrounding conducted environment affecting an impedance of the antenna system of the RFID reader.

8. The RFID reader to claim 7, wherein the controller is configured to maintain a constant impedance of the antenna system in different conducted environments.

9. The RFID reader to claim 8, wherein the controller is configured to maintain a constant card detection range in the different conducted environments.

10. The RFID reader to claim 8, wherein the controller is configured to maintain a constant impedance of 1 µH.

11. The RFID reader to claim 7, wherein the controller is configured to maintain a constant impedance of the antenna system in different conducted environments including one or metal surfaces within six millimeters of the antenna system.

12. The RFID reader to claim 7, wherein the one or more switchable inductive coils comprise one or more inner antenna loop coils within loop coils of the antenna.

13. The RFID reader to claim 12, further comprising a switching arrangement that includes one or more switching elements for resonantly coupling the one or more inner antenna loop coils to the antenna to change the impedance of the antenna.

14. The RFID reader to claim 13, further comprising at least two inner antenna loop coils.

15. The RFID reader to claim 7, wherein the antenna system is configured to operate at a resonance frequency of between 9 MHz and 25 MHz.

16. The RFID reader to claim 7, wherein the controller is configured for auto-tuning operation to automatically change the inductance of the antenna system based on the surrounding conducted environment affecting the impedance of the antenna system.

17. A method for compensating for a conducted environment in radiofrequency identification (RFID), the method comprising:
providing a signal to an antenna; and
selectively switching one or more inductive loops to resonantly couple, while being physically separated from, the one or more inductive loops with the antenna of an RFID device to change the resonant operation of the antenna based on the conducted environment.

18. The method of claim 17, further comprising maintaining a constant impedance of the antenna in different conducted environments.

19. The method of claim 18, further comprising maintaining a constant impedance of 1 µH.

20. The method of claim 17, further comprising maintaining the constant impedance of the antenna in different conducted environments including one or metal surfaces within six millimeters of the antenna.

* * * * *